(12) United States Patent
Hin et al.

(10) Patent No.: US 7,126,108 B2
(45) Date of Patent: Oct. 24, 2006

(54) PHOTODETECTOR ARRAY ARRANGEMENT FOR OPTICAL ENCODERS

(75) Inventors: Chee Chong Hin, Gelugor (MY); Michael A. Robinson, Fremont, CA (US)

(73) Assignee: Avago Technologies ECBU IP (Singapore) Pte. Ltd.(SG)

( * ) Notice: Subject to any disclaimer, the term of this patent is extended or adjusted under 35 U.S.C. 154(b) by 275 days.

(21) Appl. No.: 10/829,565

(22) Filed: Apr. 22, 2004

(65) Prior Publication Data

US 2005/0236561 A1    Oct. 27, 2005

(51) Int. Cl.
*G01D 5/34* (2006.01)
(52) U.S. Cl. ............ 250/231.13; 250/231.18; 341/9
(58) Field of Classification Search ........ 250/231.13, 250/231.14, 213.16, 231.17, 231.18; 341/9, 341/11, 13
See application file for complete search history.

(56) References Cited

U.S. PATENT DOCUMENTS

| 4,451,731 | A | 5/1984 | Leonard |
| 4,691,101 | A | 9/1987 | Leonard |
| 5,241,172 | A | 8/1993 | Lugaresi |
| 6,797,940 | B1 * | 9/2004 | Steegmueller et al. . 250/231.13 |

* cited by examiner

*Primary Examiner*—Kevin Pyo

(57) ABSTRACT

An optical encoder utilizes a photodetector array having at least two photodetectors with different surface areas that generate different amounts of photocurrent when they are simultaneously lit by an LED. Because the photodetectors generate different amounts of photocurrent when simultaneously lit, the photodetectors produce unambiguous results that can be used to index a coding element such as a codewheel. Another optical encoder utilizes one index photodetector that is aligned with an index track and another index photodetector that is aligned with a position track of a coding element to index the coding element.

15 Claims, 9 Drawing Sheets

PHOTODETECTOR ARRAY ARRANGEMENT FOR OPTICAL ENCODERS

BACKGROUND OF THE INVENTION

Optical encoders are used to monitor the motion of, for example, a shaft such as a crank shaft. Optical encoders can monitor the motion of a shaft in terms of position and/or number of revolutions of the shaft. Optical encoders typically use a codewheel attached to the shaft to modulate light as the shaft and the codewheel rotate. The light is modulated as it passes through a track on the codewheel that includes a pattern of transparent and opaque sections. As the light is modulated in response to the rotation of the codewheel, a stream of electrical signals is generated from a photodetector array that receives the modulated light. The electrical signals are used to determine the position and/or number of revolutions of the shaft.

Separate position and index tracks on the codewheel are used to determine position and number of revolutions. The position and index tracks must be precisely aligned with the corresponding position and index track photodetector arrays to achieve reliable results. Because each track must be aligned with its corresponding photodetector array, the task of alignment becomes more difficult as the number of tracks increases. Further, some applications of optical position encoders demand higher resolution position information, which requires smaller tracks and photodetector arrays. Smaller tracks and photodetector arrays add additional challenges to the task of alignment.

SUMMARY OF THE INVENTION

An optical encoder utilizes a photodetector array having at least two photodetectors with different surface areas that generate different amounts of photocurrent when they are simultaneously lit by an LED. Because the photodetectors generate different amounts of photocurrent when simultaneously lit, the photodetectors produce unambiguous results that can be used to index a coding element such as a codewheel.

Another optical encoder utilizes one index photodetector that is aligned with an index track and another index photodetector that is aligned with a position track of a coding element to index the coding element.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description similar reference numbers may be used to identify similar elements.

DETAILED DESCRIPTION

Figure 1:
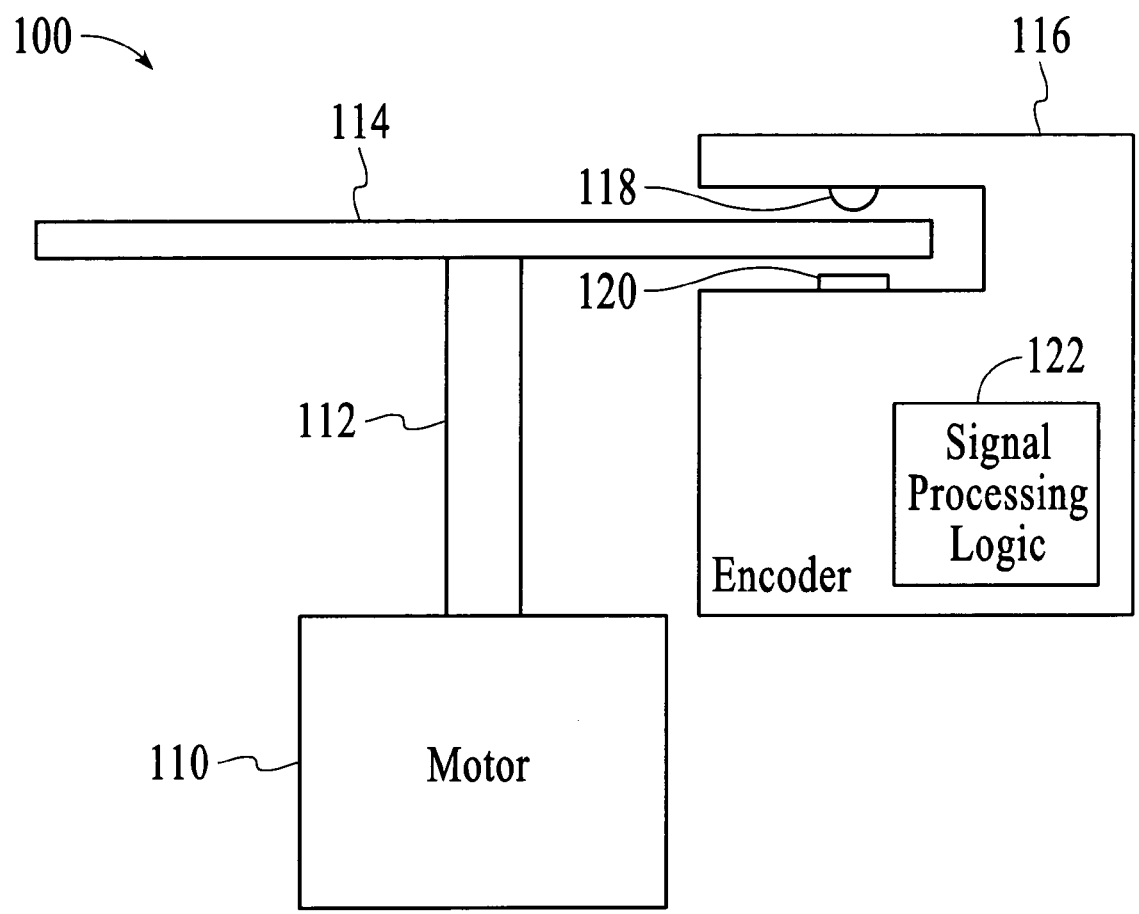
FIG. 1 depicts an optical encoder system for measuring the rotational movement of a shaft.

FIG. 1 depicts an optical encoder system 100 for measuring the rotational movement of a shaft. The optical encoder system includes a motor 110, a shaft 112, a codewheel 114, and an encoder 116. The codewheel includes at least one track (not shown) and the encoder includes a light source 118 of at least one LED and a photodetector array 120 that are aligned with the track. The encoder also includes signal processing logic 122 that processes electrical signals that are output from the photodetector array to measure the rotational movement of the shaft. The motor, shaft, codewheel, and encoder are well-known in the field of optical position encoders. In particular, see U.S. Pat. Nos. 4,451,731, 4,691,101, and 5,241,172, which are incorporated by reference herein.

Figure 2:
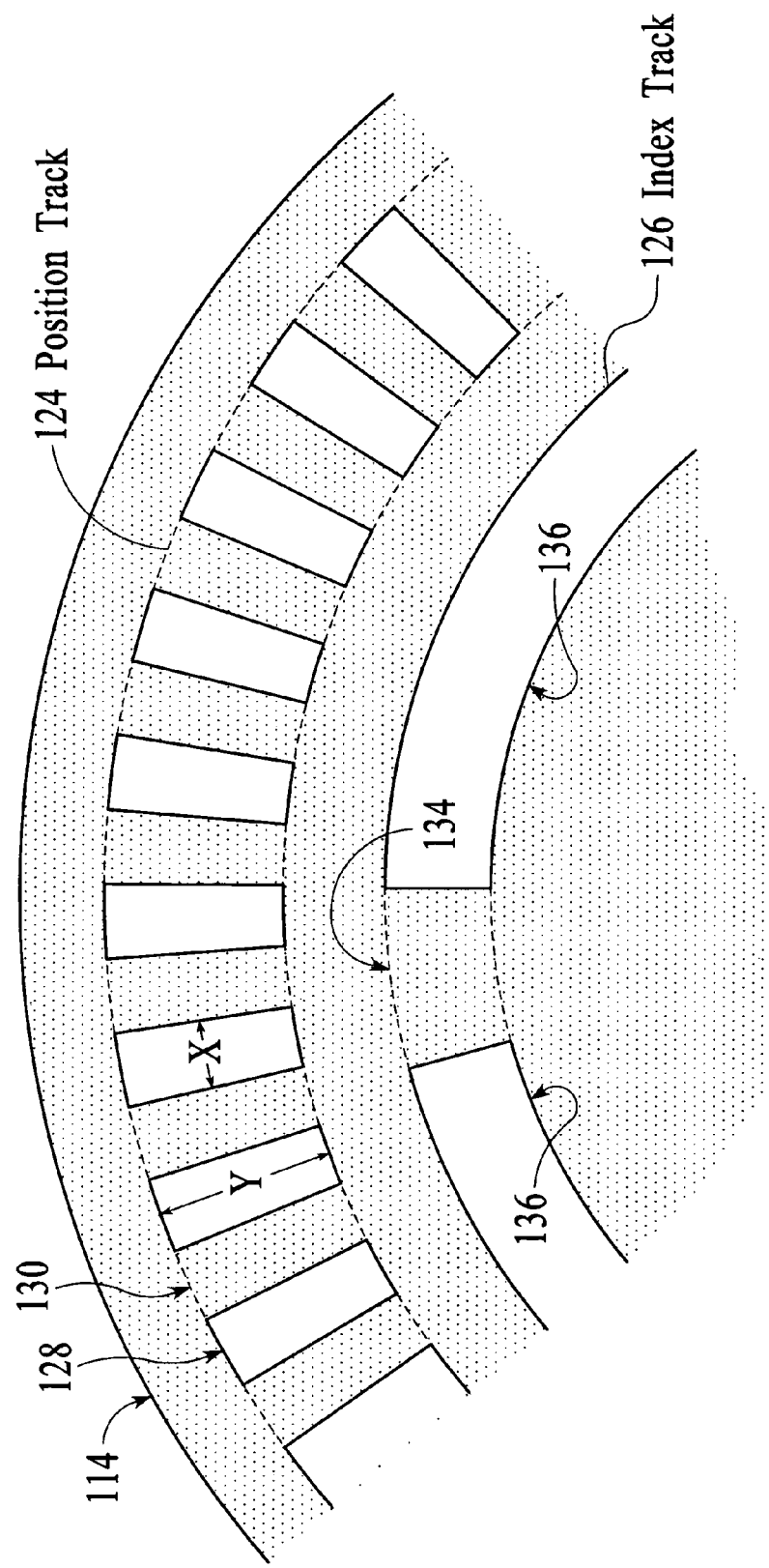
FIG. 2 depicts a portion of a codewheel that includes a position track and an index track.

FIG. 2 depicts a portion of a codewheel 114 that includes a position track 124 and an index track 126. The position and index tracks are circular tracks that are concentric with the codewheel. The position track includes a continuous repeating pattern of transparent sections 128 and opaque sections 130 that go all the way around the codewheel. The position track modulates light to measure positional changes of the codewheel and the shaft 112. In the embodiment of FIG. 2, the transparent and opaque sections of the position track have the same circumferential dimensions (also referred to as the width dimension). The width dimensions of the transparent and opaque sections (as indicated by the span "x") are a function of the desired resolution. The radial dimensions (referred to herein as the height dimensions) of the transparent and opaque sections (as indicated by the span "y") are a function of the amount of area required to generate a sufficient amount of photocurrent (e.g., the more photocurrent that is required, the larger the area required and hence the larger "y" needs to be since area equals "x" times "y"). Throughout the description, the height of the position track is equivalent to the height of the transparent sections of the position track. The position track may utilize other patterns of transparent and opaque sections to modulate light as is known in the field.

The index track 126 depicted in FIG. 2 is primarily a transparent track that includes at least one opaque section 134 as an indexing feature. The index track is used to measure revolutions of the codewheel and shaft. For example, the index track can be used to indicate the completion of a revolution and/or to count the number of revolutions. The index track may utilize other patterns of transparent and opaque sections to modulate light as is known in the field. For example, the index track may be a primarily opaque track with a transparent section as the indexing feature. The radial and circumferential dimensions (also referred to respectively herein as the height and width dimensions) of the indexing feature are a function of photosensitive area and resolution. Throughout the description, the height of the index track is equivalent to the height of the transparent section 136 or sections of the index track. Measuring revolutions using the index track is described in more detail below.

Figure 3:
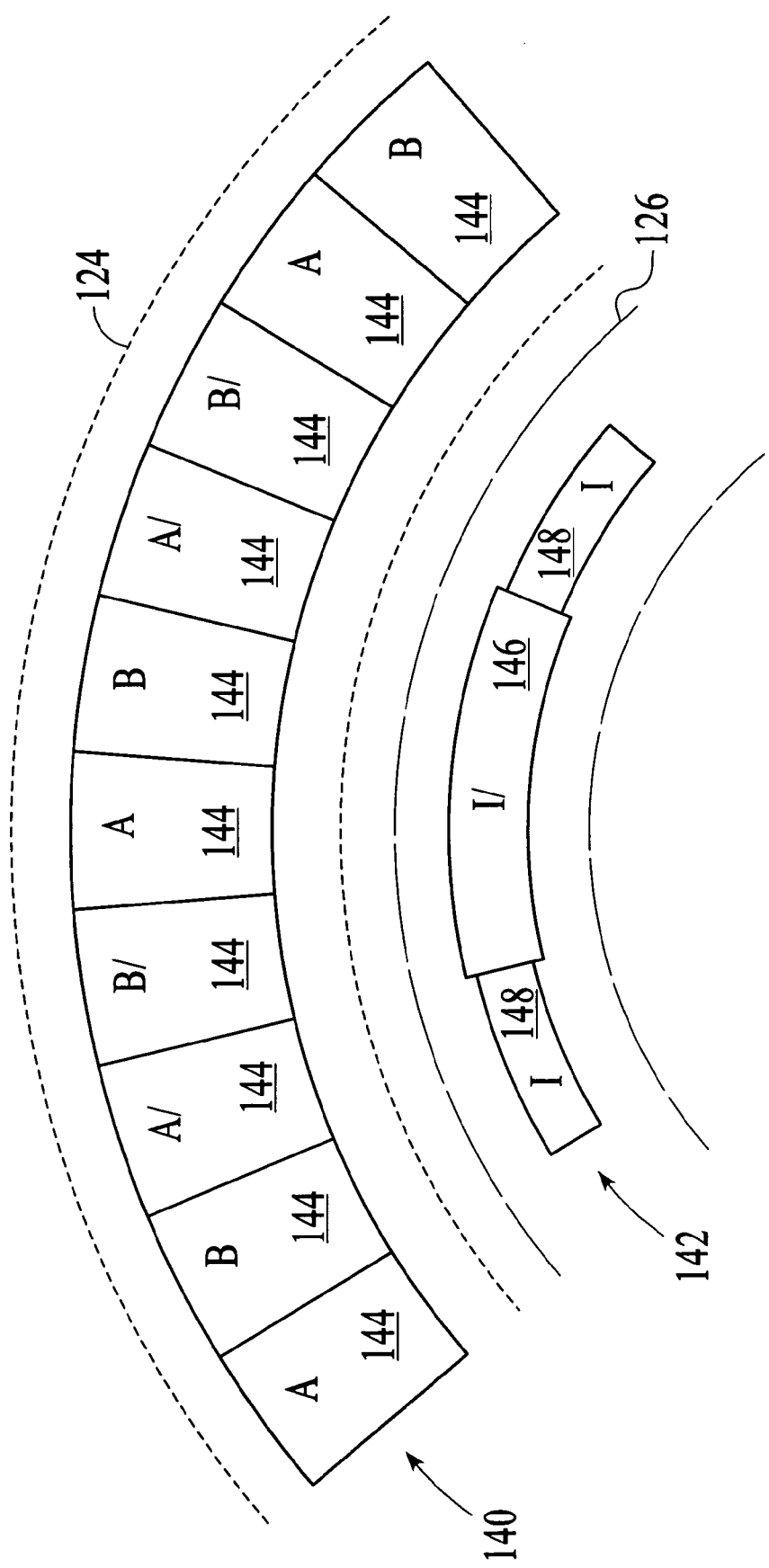
FIG. 3 depicts an embodiment of position and index track photodetector arrays that correspond to respective position and index tracks of a codewheel, for example, the position and index tracks depicted in FIG. 2.

FIG. 3 depicts an embodiment of position and index track photodetector arrays 140 and 142 that correspond to respective position and index tracks 124 and 126 of a codewheel, for example, the position and index tracks depicted in FIG. 2. The position track photodetector array includes a series of photodetectors 144 that are aligned with the corresponding position track (the position track is indicated by the dashed lines 124). Each of the photodetectors has the same surface area and the same radial dimension (also referred to herein as the height dimension). Note that the side edges of the photodetectors are essentially along lines that radiate from the center of the codewheel.

The position track photodetectors 144 depicted in FIG. 3 are labeled in a repeating pattern of A, B, A/, B/ where "A/" is read as "A bar" and "B/" is read as "B bar." This designation of the photodetectors and the corresponding electrical signals that are generated by the photodetectors is well-known in the field. The circumferential dimensions (also referred to as the width dimensions) of the position track photodetectors are related to the width dimensions of the transparent and opaque sections of the corresponding position track. In the embodiment of FIG. 3, each position track photodetector has a width that is one half the width of the transparent and opaque sections of the corresponding position track.

The index track photodetector array 142 includes a central photodetector 146 and two side photodetectors 148 that are aligned with the corresponding index track (the index track is indicated by the dashed lines 126). The side photodetectors are located directly adjacent to the central photodetector. The central photodetector is labeled as "I/," which is read as "I bar" and the side photodetectors are labeled as "I." This designation of the photodetectors and the corresponding electrical signals that are generated by the photodetectors is well-known in the field. In the embodiment of FIG. 3, the central photodetector has a surface area that is larger than the combined surface area of the two side photodetectors. The central photodetector has a larger surface area than the combined surface area of the two side photodetectors so that the indexing feature of the index track can be readily identified as the codewheel rotates. The effect of the different surface areas on identifying the indexing feature is described in detail below with reference to FIGS. 5 and 6.

Figure 4:
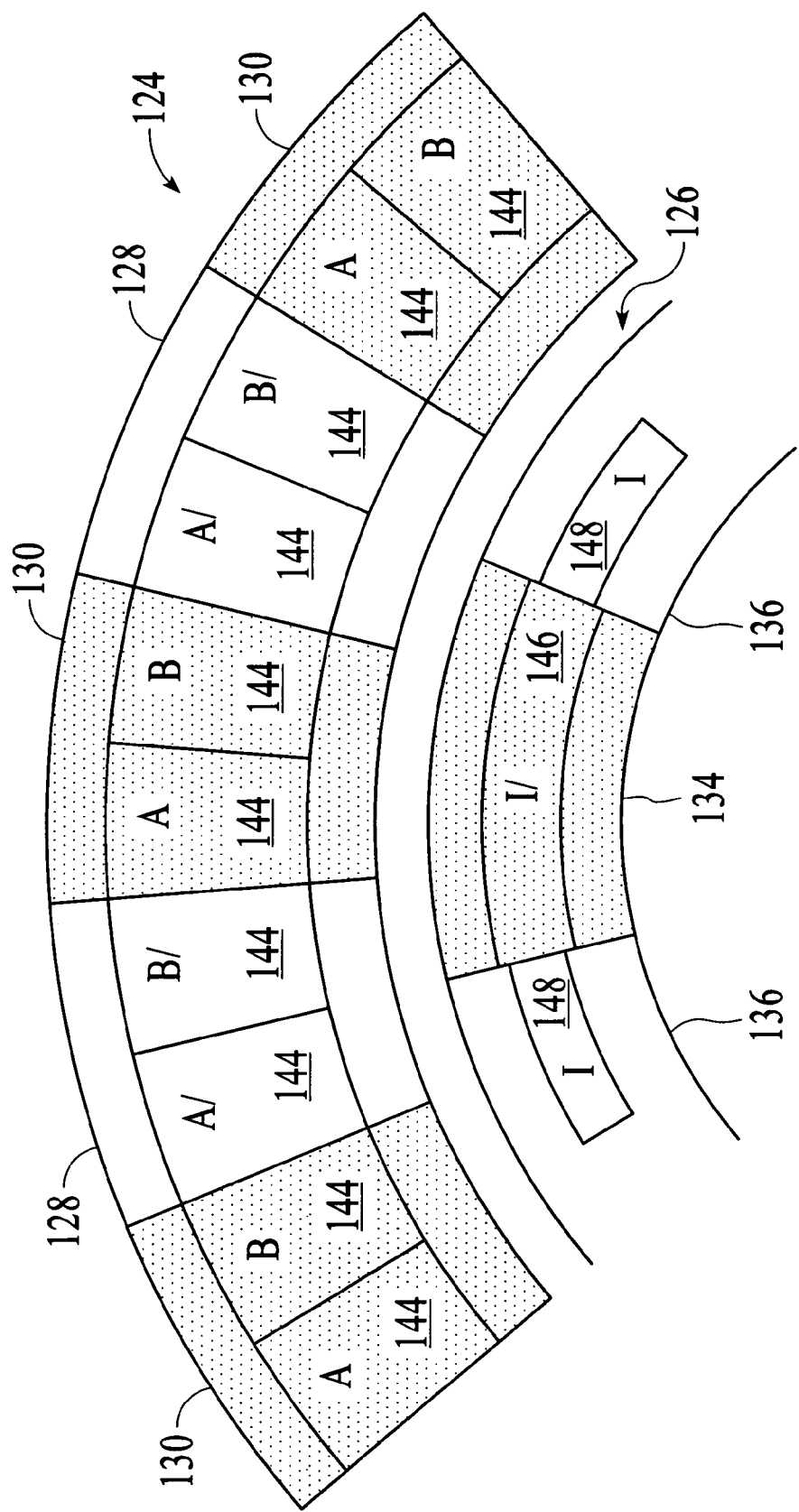
FIG. 4 depicts the position and index photodetector arrays of FIG. 3 relative to the respective position and index tracks of a corresponding codewheel.

FIG. 4 depicts the position and index photodetector arrays 140 and 142 of FIG. 3 relative to the respective position and index tracks 124 and 126 of a corresponding codewheel. With reference to the position track, the codewheel includes a pattern of transparent and opaque sections 128 and 130, respectively. As described above, the width dimension of each opaque and transparent section is the same as the combined width of two photodetectors 144. In FIG. 4, the transparent and opaque sections of the position track are aligned with the position track photodetectors 144 to clearly illustrate the relationship between the dimensions of the photodetectors and the features of the position track.

Turning to the index track 126, the index track portion of the codewheel is transparent 136 except for one opaque section 134 (i.e., the indexing feature). In the embodiment of FIG. 4, the width of the indexing feature is the same as the width of the central photodetector 146 and the two elements are circumferentially aligned to clearly illustrate the dimensional relationship.

Operation of the position track 124 and corresponding photodetector array 140 involves modulating light as the codewheel rotates and detecting the light at the photodetectors 144. The physical layout of the photodetectors relative to the position track causes the generated electrical signals to be phase shifted by 90 degrees from each other. The signals are combined in pairs to form quadrature push pull signals. This operation is fully described in U.S. Pat. No. 4,691,101, which is incorporated by reference herein.

Figure 5:
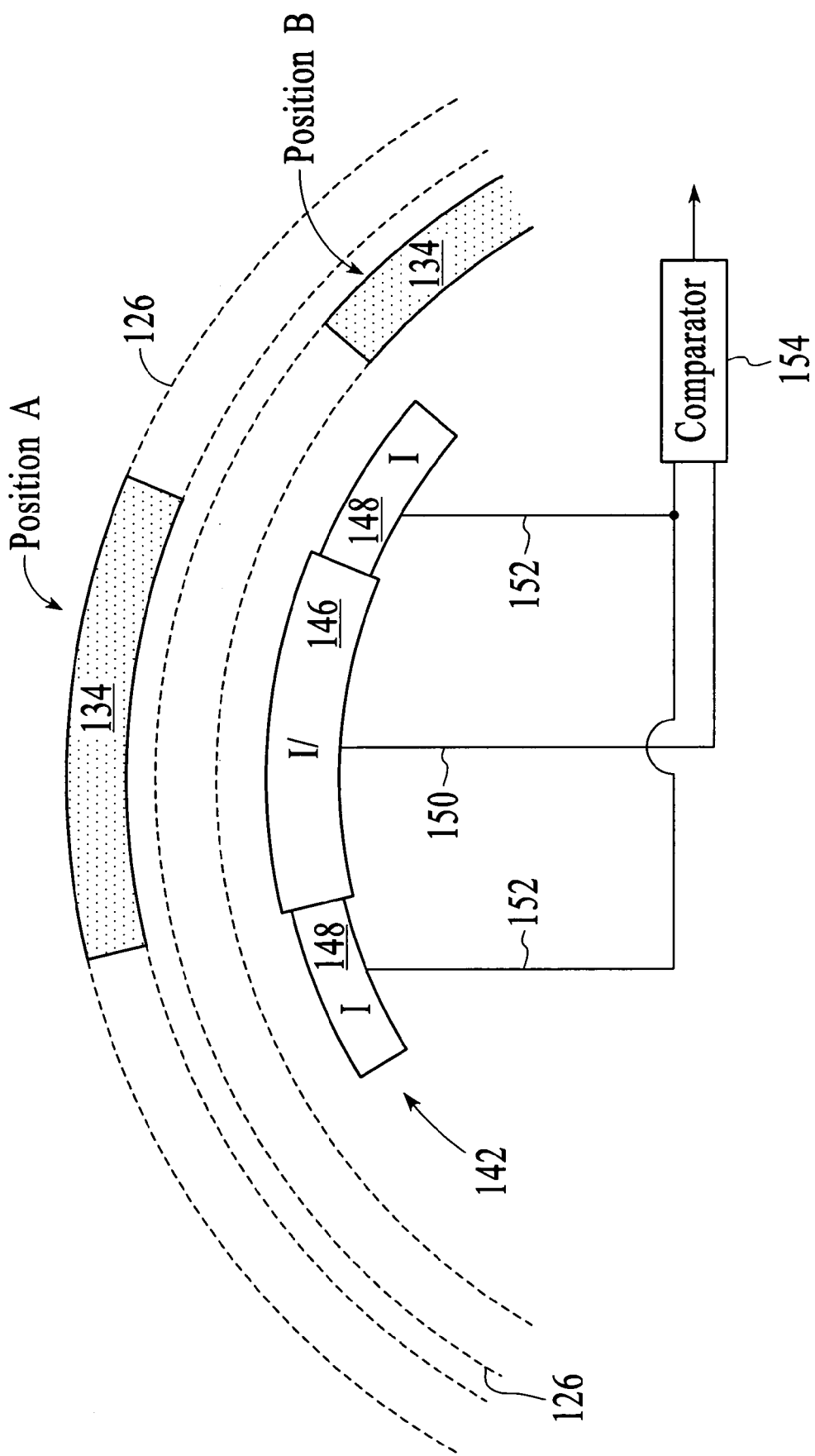
FIG. 5 depicts two positions of an index track relative to the index track photodetector array, where the indexing feature is transparent.

Operation of the index track 126 and corresponding photodetector array 142 is described with reference to FIGS. 5 and 6. FIG. 5 depicts two positions of the index track relative to the index track photodetector array. In the embodiment of FIG. 5, the index track is primarily transparent with an opaque indexing feature 134 that has the same width dimension as the central photodetector 146 of the photodetector array. The figure also depicts the signal paths 150 and 152 and processing logic 154 (e.g., a comparator) related to the photodetector array. In position A, the opaque indexing feature of the index track is aligned with the central photodetector. When the opaque indexing feature is aligned with the central photodetector, light from the light source (not shown) is blocked from hitting the central photodetector and therefore the amount of photocurrent produced by the two side photodetectors 148 is greater than the photocurrent produced from the central photodetector. The photocurrents produced from the two side photodetectors and the central photodetector are continuously compared to each other at the comparator. The comparator outputs a signal that indicates which of the photodetectors ("I/" or "I") outputs the most photocurrent.

In the embodiment of FIG. 5, when the indexing feature is in position A, the photocurrent I is greater than the photocurrent I/ and a logic "1" is output from the comparator. When the indexing feature is in position B (e.g., no light is blocked from hitting the photodetector array), the photocurrent I is less than the photocurrent I/ and a logic "0" is output from the comparator. In position B, the photocurrent I/ is greater than the photocurrent I because the surface area of the central photodetector is greater than the surface area of the two side photodetectors combined. If the surface area of the I/ photodetector was not greater than the combined surface area of the I photodetectors, then the encoder may generate ambiguous results when the I and I/ photodetectors are simultaneously lit. Revolutions of the codewheel and shaft are monitored by monitoring the output of the comparator.

Figure 6:
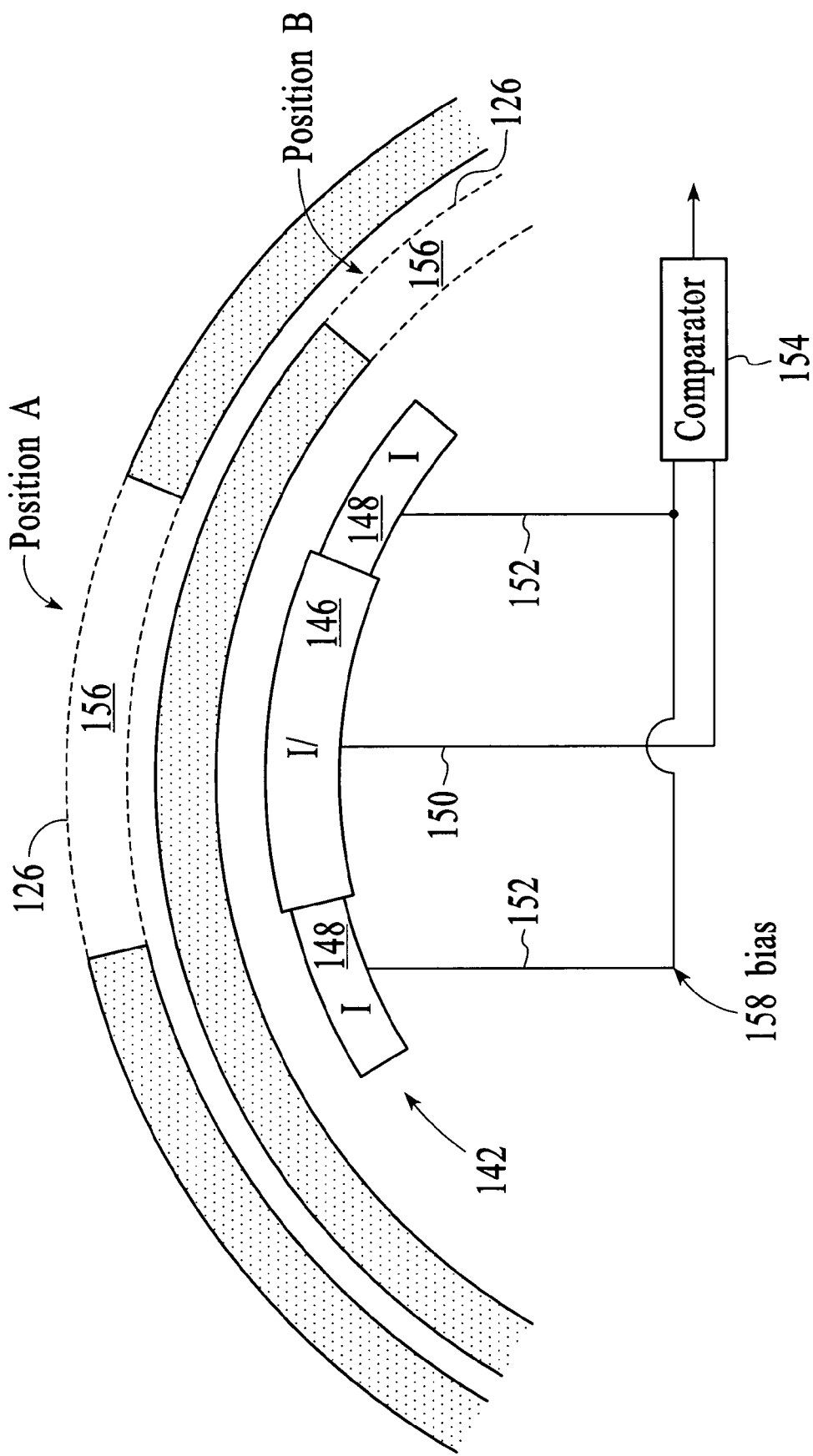
FIG. 6 depicts two positions of the indexing track relative to the index track photodetector array, where the indexing feature is opaque.

FIG. 6 depicts two positions of the index track 126 relative to the index track photodetector array 142. In the embodiment of FIG. 6, the index track is primarily opaque with a transparent indexing feature 156 that has the same width dimension as the central photodetector 146 of the photodetector array. The figure also depicts the signal paths 150 and 152 and processing logic 154 (e.g., a comparator) related to the photodetector array. A bias 158 is applied to the signal path (e.g., signal path 152) for the side photodetectors 148. In position A, the transparent indexing feature of the index track is aligned with the central photodetector. When the transparent indexing feature is aligned with the central photodetector, light from the light source (not shown) primarily hits the central photodetector and therefore the amount of photocurrent produced by the central photodetector is greater than the photocurrent produced from the two side photodetectors.

When the indexing feature is in position A, because the photocurrent I/ is greater than the photocurrent I, a logic "1" is output from the comparator. When the indexing feature is in position B (e.g., no light is hitting the photodetector array), the photocurrent I is greater than the photocurrent I/ because of the bias that is applied to the I signal. As a result, a logic "0" is output from the comparator. In this case, the bias that is applied to the I signal makes the I photocurrent greater than the I/ photocurrent in spite of the fact that the central photodetector has a larger surface area than the surface area of the two side photodetectors combined. Revolutions of the codewheel and shaft can be monitored by monitoring the output of the comparator. Although the width of the transparent indexing feature is the same as the width of the central photodetector, the width of the transparent indexing feature can be increased up to the total width of the photodetector array while still providing the desired response.

Although FIGS. 5 and 6 utilize the difference in photodetector surface area to produce different output signals, different output signals can be produced by opaquing portions of the "I" photodetectors or by reducing the amount of light that is incident on the "I" photodetectors (e.g., the two side photodetectors 148) compared to the "I/" photodetector (e.g., the central photodetector 146). The general principal being that when the index track photodetector array is equally lit, the photocurrent "I/" will dominate the photocurrent "I."

As used herein, the term "track" includes both the opaque and the transparent sections of the coding element or codewheel.

Figure 7:
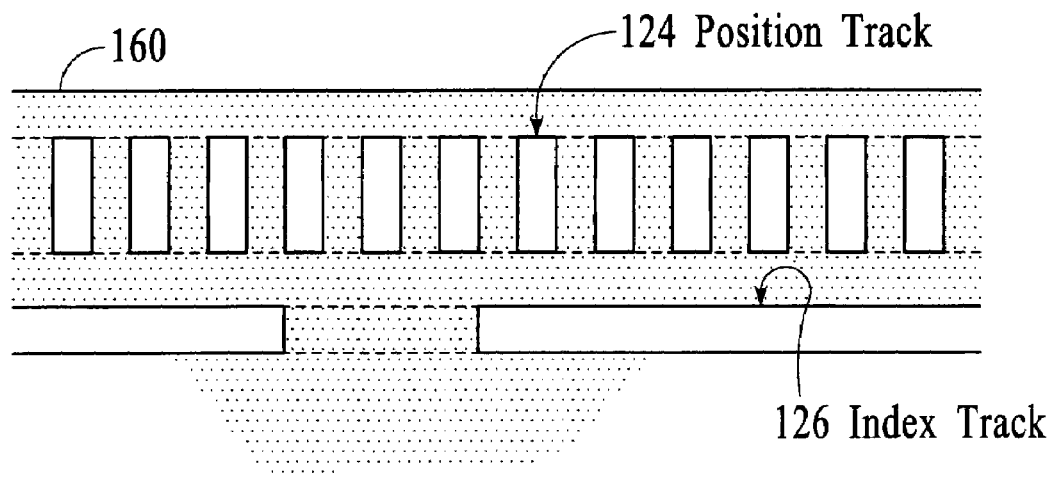
FIG. 7 depicts an embodiment of a linear coding element that includes linear position and index tracks, where the indexing feature is transparent.
Figure 8:
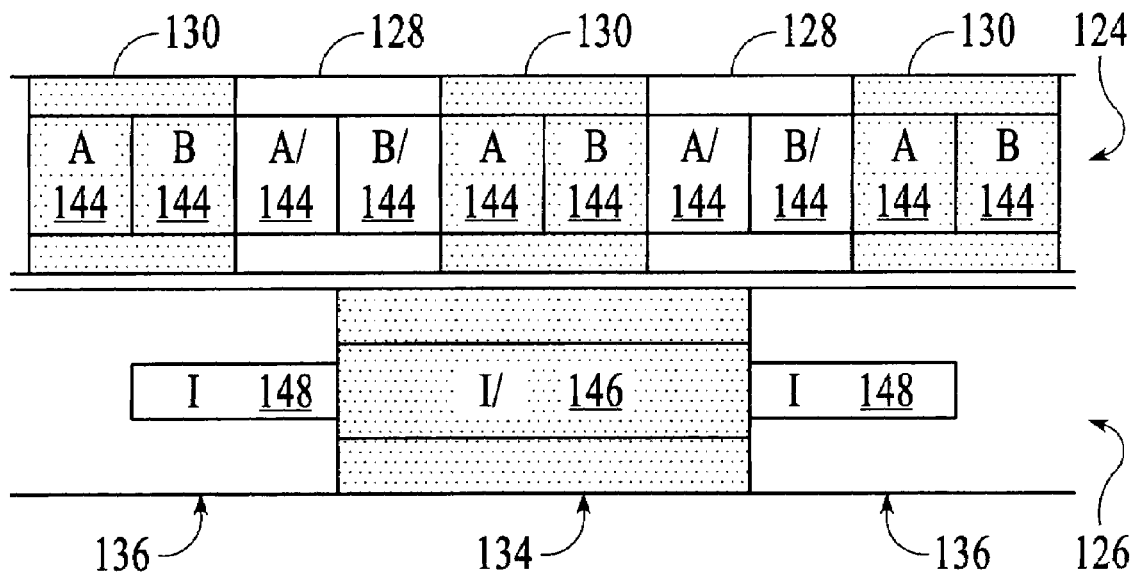
FIG. 8 depicts position and index photodetector arrays relative to respective position and index tracks of a linear coding element.

Although the optical encoder system 100 and the corresponding codewheel 114 are described in terms of measuring rotary movement, the same principals can be applied to measuring linear movement. FIG. 7 depicts an embodiment of a linear coding element 160 that includes linear position and index tracks 124 and 126. Although the position and index tracks and corresponding photodetector arrays are described in FIGS. 2–6 using a codewheel, the same principals are applicable to linear coding elements. Further, the photodetector arrays depicted in FIGS. 3–6 can be made linear instead of curved. FIG. 8 depicts position and index photodetector arrays relative to respective position and index tracks of a linear coding element.

Figure 9:
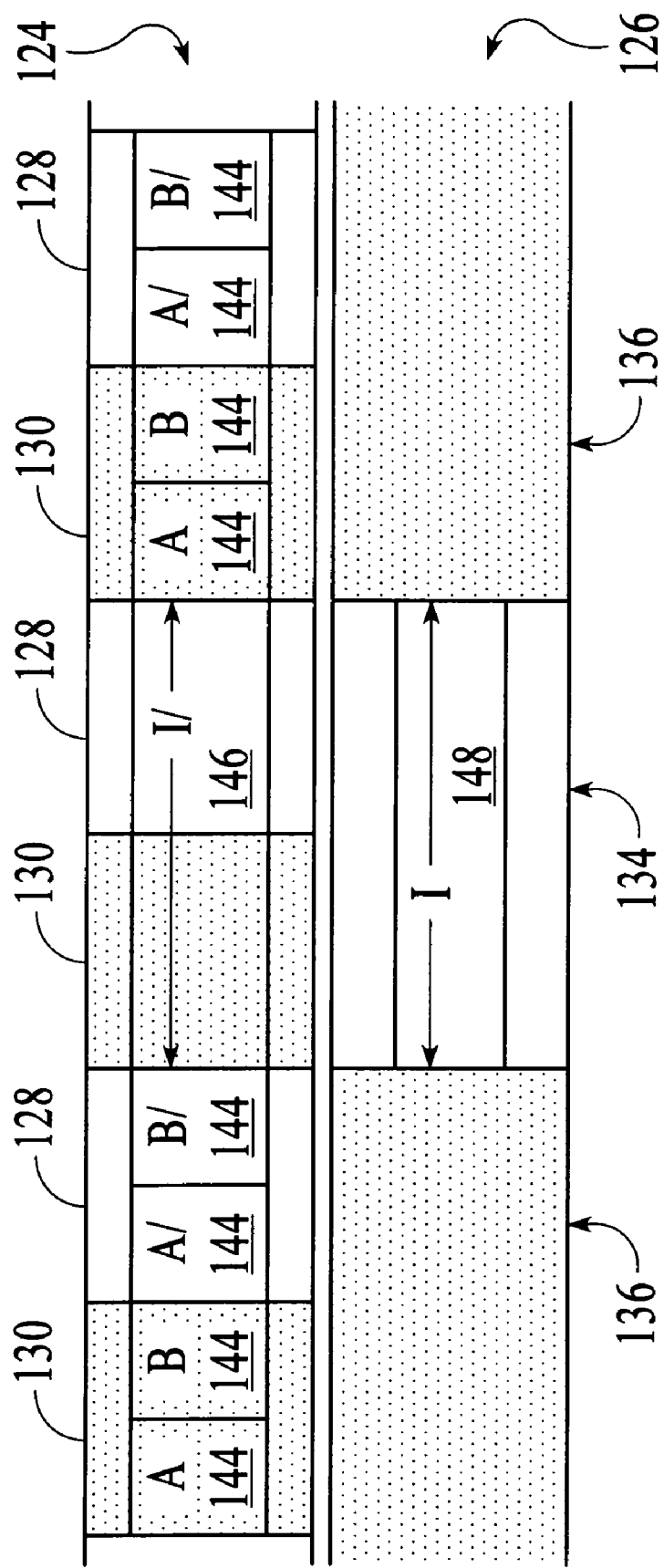
FIG. 9 depicts an embodiment of position and index photodetectors relative to the position and index tracks of a linear coding element, where the index photodetectors are distributed between the index track and the position track.

In another embodiment, the photodetector array that is used for indexing is distributed between the index track and the position track. For example, at least one of the index photodetectors 146 and 148 is integrated with the position track photodetector array. FIG. 9 depicts an embodiment of position and index photodetectors relative to the position and index tracks 124 and 126 of a linear coding element. In the embodiment of FIG. 9, the I/ photodetector 146 is located between a B/ and an A photodetector and has a width dimension that is equal to the combined width of an opaque section 130 and a transparent section 128 of the position track. In operation, the I/ photodetector will always be half lit whereas the I photodetector 148 will be lit only when the index feature 134 (e.g., an indexing window of the index track) passes the I photodetector. When the opaque section 136 of the index track is over the I photodetector (not shown), the photocurrent from the I/ photodetector is greater than the photocurrent from the I photodetector (e.g., I/>I) and the output from the corresponding comparator is logic low. However, when the index feature of the index track exposes more of the I photodetector than the position track exposes of the I/ photodetector (as shown in FIG. 9), the photocurrent from the I photodetector is greater than the photocurrent from the I/ photodetector (e.g., I>I/) and the output from the corresponding comparator is logic high.

Figure 10:
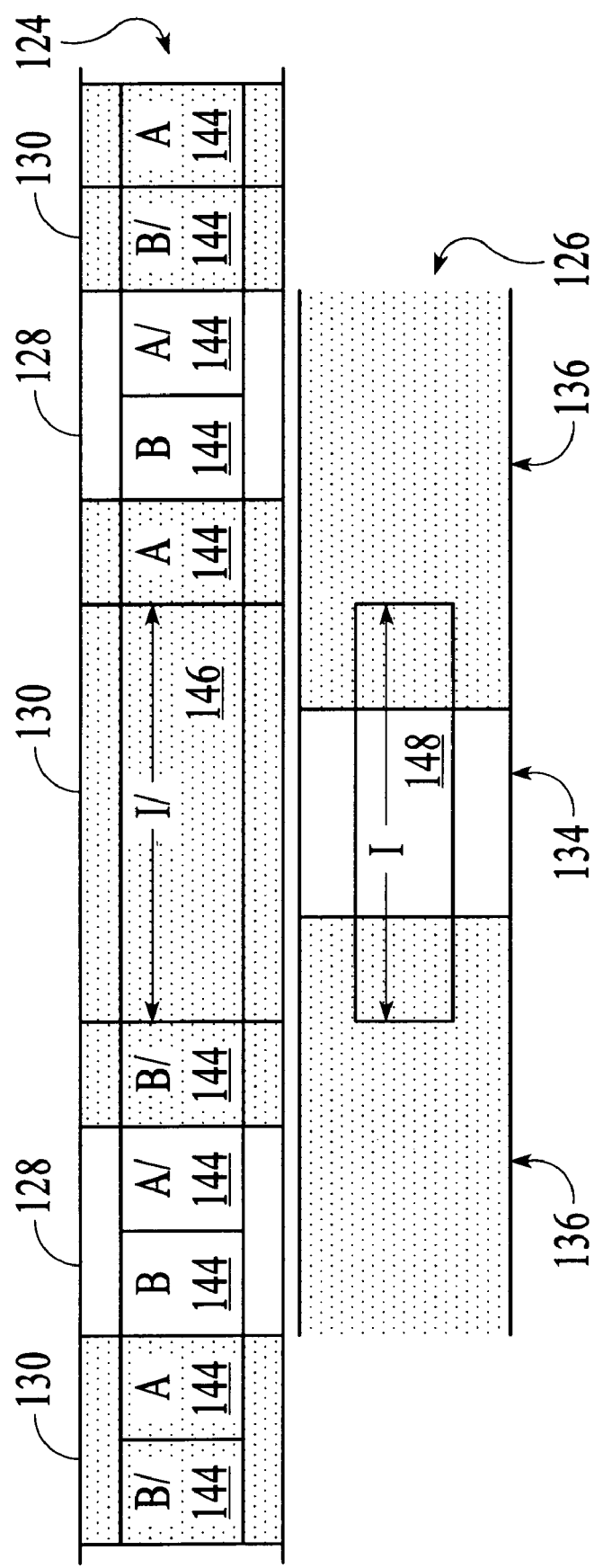
FIG. 10 depicts another embodiment of position and index photodetectors relative to the position and index tracks of a linear coding element, where the index photodetectors are distributed between the index track and the position track.

It should be noted that the I/ photodetector 146 need not be half-lit at the point of indexing. For example, the position track could be designed to completely cover the I/ photodiode at the point of indexing. Doing so creates some errors in the position track as the irregularly wide opaque section passes over the position photodetector array. However, if there are enough cycles of the A, B, A/, and B/ photodetectors, the errors can be averaged out. An alternative coding element design which includes one extra long opaque section and which relies on multiple cycles of photodiodes to average out errors is depicted in FIG. 10. In the embodiment of FIG. 10, one of the sections of the position track that should be transparent is actually opaque. Further, the position and index tracks 124 and 126 are configured such that as one edge of the transparent section of the index track aligns with one of the I photodetector 148 edges, the opposite edge of the opaque section over the I/ photodetector 146 is aligned with one edge of the I/ photodetector. In this configuration, as one of the index photodetectors is about to be exposed, the other is just about to be blocked.

Different index pulse widths can be obtained by changing the relative surface area between the I/ and I photodetectors. In the embodiments of FIGS. 9 and 10, the positions of the I/ and I photodetectors as well as the light and opaque sections of the coding element can be swapped around to produce a logic high or low at the point of indexing. Also, the position of the I and I/ photodetectors relative to the position track can be manipulated to set the point when the Index channel will trigger. The embodiments of FIGS. 9 and 10 can be applied to a codewheel for detecting rotational movement.

Although the width dimensions of the position photodetectors 144 and the central photodetector 146 of the index photodetectors match the width dimension, or a multiple thereof, of sections of the respective position and index tracks 124 and 126, in the embodiments of FIGS. 2–10, the height dimensions of the photodetectors in both the position and index photodetector arrays are smaller than the height dimension of the transparent sections of the respective tracks. As illustrated in FIG. 4, the height of the position track photodetectors is smaller than the height of the position track and the heights of the index track photodetectors are smaller than the height of the index track. The height dimensions of the photodetectors are smaller than the height dimensions of the corresponding transparent sections of the tracks in order to provide alignment tolerance between the photodetector arrays and the corresponding tracks. Alignment between the tracks and the photodetector arrays is important because misalignment in the radial direction may cause the photodetectors to be only partially illuminated, thereby causing artificially low photocurrent to be produced by the partially illuminated photodetectors. The artificially low photocurrent may trigger the index signal to erroneously fire multiple times or not at all. The alignment tolerance provided by the smaller height dimension of the photodetectors enables the photodetectors and tracks to withstand some degree of radial misalignment without detrimentally impacting photocurrent generation. In prior art encoder systems, the height dimensions of the photodetectors are the same as the corresponding tracks and as a result, any radial misalignment between the photodetectors and the tracks can cause detrimental changes in the resulting photocurrent. Although the height dimensions of the photodetectors are described as smaller than the track heights, this is not a requirement.

In an embodiment, the tracks 124 and 126 and respective photodetector arrays 140 and 142 are radially aligned such that the photodetectors are in the middle of the corresponding track. For example, as depicted in FIG. 4 the photodetector arrays are positioned at the center of the respective tracks. Radially aligning the respective photodetector arrays in the middle of the corresponding tracks balances the alignment tolerance on both sides of the photodetector arrays.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical encoder comprising:
    a coding element having an index track with at least one transparent section and a separate position track having multiply transparent sections;
    a light source positioned to output light to the index and position tracks;
    an index photodetector array positioned to detect light that passes through the transparent section of the index track, the index photodetector array comprising first and second photodetectors with different surface areas and a combined width dimension that allows the entire index photodetector array to be simultaneously lit by light that passes through the transparent section of the index track; and
    a separate position track photodetector array positioned to detect light that passes through the transparent sections of the position track.

2. The optical encoder of claim 1 wherein the first and second photodetectors generate different amounts of photocurrent when simultaneously lit by the light source.

3. The optical encoder of claim 1 wherein the index track of the coding element includes an opaque section with a width dimension that matches the width dimension of the first photodetector.

4. The optical encoder of claim 1 further including a third photodetector, wherein the surface area of the first photodetector is greater than the surface area of the second and third photodetectors combined.

5. The optical encoder of claim 4 wherein the first photodetector generates more photocurrent than the second and third photodetectors combined when the first, second, and third photodetectors are simultaneously lit.

6. The optical encoder of claim 4 wherein the second and third photodetectors are located adjacent to either side of the first photodetector.

7. The optical encoder of claim 6 wherein the coding element includes an opaque section with a width dimension that matches the width dimension of the first photodetector.

8. The optical encoder of claim 1 wherein the index track comprises a primarily transparent track with at least one opaque section.

9. The optical encoder of claim 1 wherein the index track comprises a primarily opaque track with at least one transparent section.

10. An optical encoder for indicating the rotational movement of a shaft comprising:
    a codewheel having an index track with at least one transparent section;
    a light emitting diode (LED) positioned to output light to the index track; and
    an index photodetector array positioned to detect light that passes through the transparent section of the index track, the index photodetector array comprising first and second photodetectors with different surface areas and a combined width dimension that allows the entire index photodetector array to be simultaneously lit by light that passes through the transparent section of the codewheel;
    wherein the index track of the codewheel includes an opaque section with a width dimension that matches the width dimension of the first photodetector.

11. The optical encoder of claim 10 wherein the first and second photodetectors generate different amounts of photocurrent when simultaneously lit by the LED.

12. The optical encoder of claim 10 further including a third photodetector, wherein the surface area of the first photodetector is greater than the surface area of the second and third photodetector combined.

13. The optical encoder of claim 12 wherein the first photodetector generates more photocurrent than the second and third photodetectors combined when the first, second, and third photodetectors are simultaneously lit.

14. The optical encoder of claim 12 wherein the second and third photodetectors are located adjacent to either side of the first photodetector.

15. An optical encoder for indicating the rotational movement of a shaft comprising:
    a codewheel having an index track with at least one transparent section;
    a light emitting diode (LED) positioned to output light to the index track; and
    an index photodetector array positioned to detect light that passes through the transparent section of the index track, the index photodetector array comprising first and second photodetectors with different surface areas and a combined width dimension that allows the entire index photodetector array to be simultaneously lit by light that passes through the transparent section of the codewheel;
    wherein the index track comprises a primarily opaque track with the at least one transparent section comprising a transparent section with a width dimension that matches the width dimension of the first photodetector.

* * * * *

UNITED STATES PATENT AND TRADEMARK OFFICE
CERTIFICATE OF CORRECTION

| | |
|---|---|
| PATENT NO. | : 7,126,108 B2 |
| APPLICATION NO. | : 10/829565 |
| DATED | : October 24, 2006 |
| INVENTOR(S) | : Chee Chong Hin |

It is certified that error appears in the above-identified patent and that said Letters Patent is hereby corrected as shown below:

Column 7, Line 21, Claim 1, delete "clement" and insert -- element --;

Column 7, Line 23, Claim 1, delete "multiply" and insert -- multiple --;

Column 8, Line 30, Claim 12, delete "photodetector" and insert -- photodetectors --.

Signed and Sealed this

Eighth Day of June, 2010

David J. Kappos
*Director of the United States Patent and Trademark Office*